United States Patent [19]

Howat

[11] 4,270,963
[45] Jun. 2, 1981

[54] WRAPPING ARTICLES OF INDEFINITE LENGTH

[75] Inventor: Robert J. Howat, Kingston, Canada

[73] Assignee: Northern Telecom Limited, Montreal, Canada

[21] Appl. No.: 76,298

[22] Filed: Sep. 17, 1979

[51] Int. Cl.³ .............................................. B31F 1/00
[52] U.S. Cl. ................................. 156/201; 156/54; 156/438; 156/461
[58] Field of Search ................................. 156/52–56, 156/200–203, 438, 461; 226/129, 130

[56] References Cited
U.S. PATENT DOCUMENTS

| | | | |
|---|---|---|---|
| 432,196 | 7/1890 | Dooley | 228/129 |
| 435,629 | 9/1890 | Holcombe | 156/54 |
| 450,839 | 4/1891 | Walcott | 228/130 X |
| 3,011,933 | 12/1961 | Barnes et al. | 156/54 |
| 4,159,920 | 7/1979 | Andersson et al. | 156/201 |

Primary Examiner—David A. Simmons
Attorney, Agent, or Firm—Sidney T. Jelly

[57] ABSTRACT

Wrapping an article such as cable or optical fibre in wrapping material by a progressive operation in which the wrapping material is pressed along a narrow width portion to the article and then succeeding width portions are also turned around the article and pressed against it. The procedure is intermittent with each width portion turned completely against the article before turning of the next portion. This method eliminates wrinkles in the wrapping material. The process is convenient when using contact adhesive on a surface of the wrapping material.

4 Claims, 6 Drawing Figures

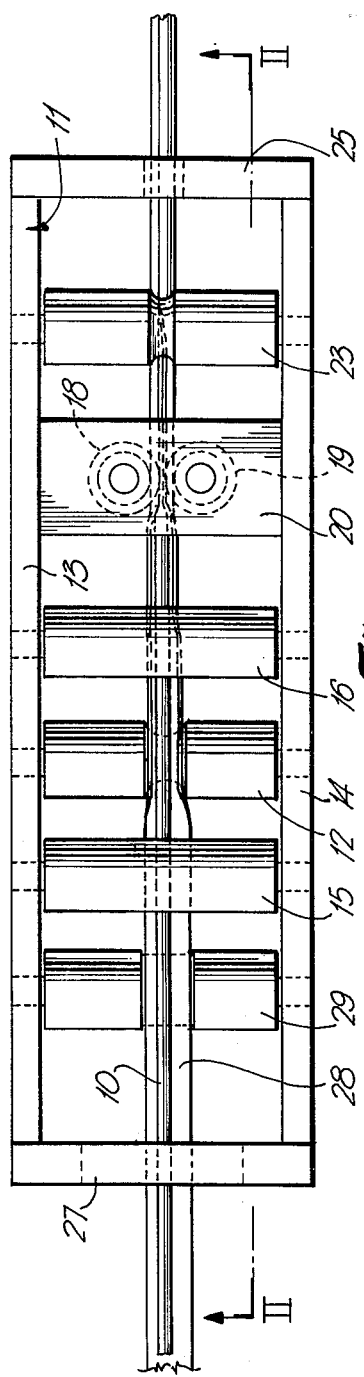
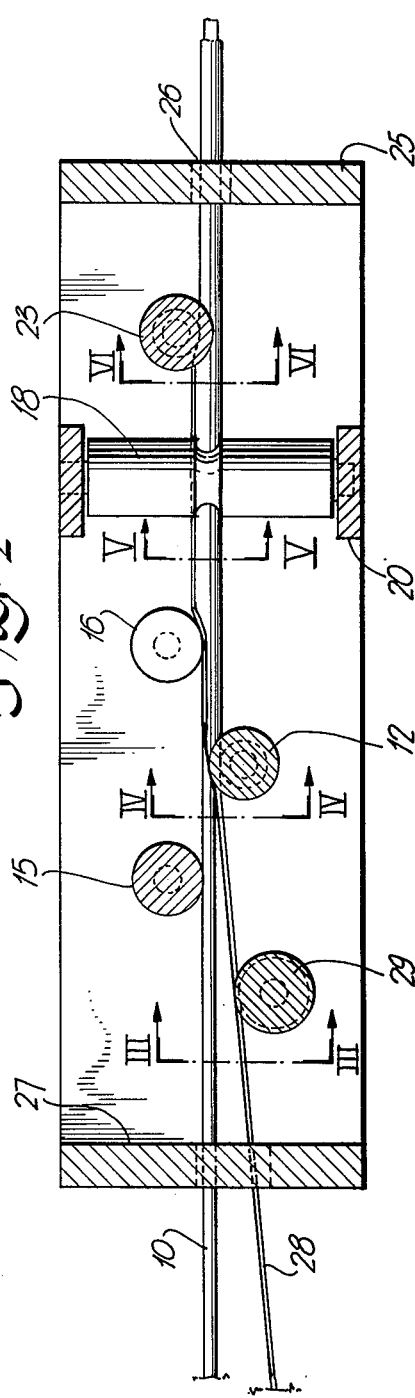

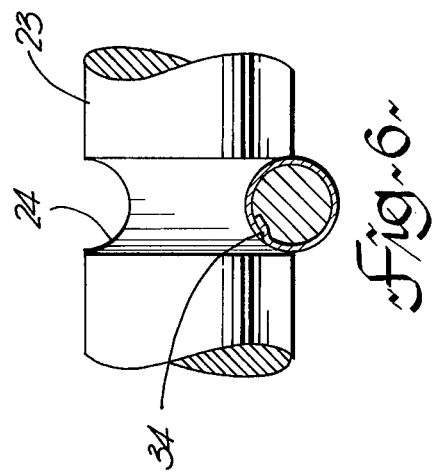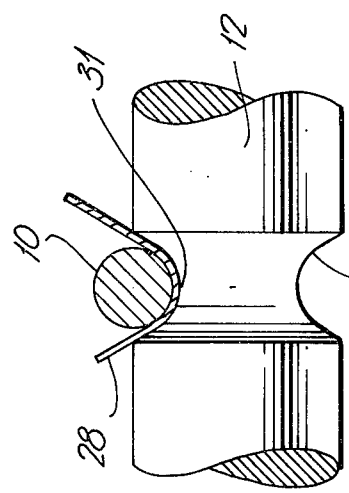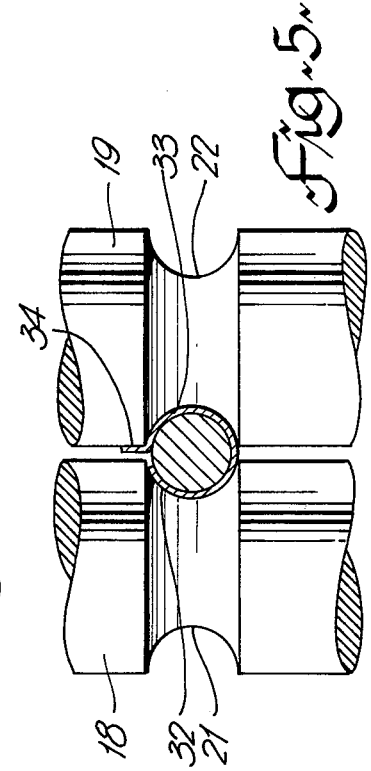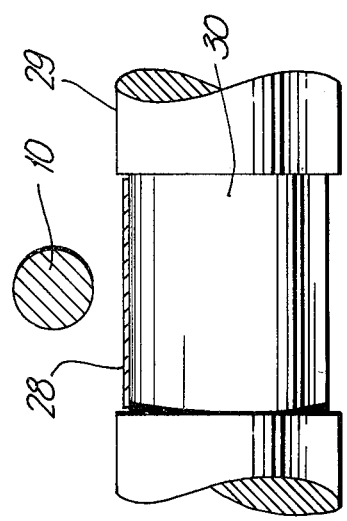

WRAPPING ARTICLES OF INDEFINITE LENGTH

This invention relates to methods and apparatus for wrapping articles of indefinite length.

Conventionally in the wrapping of articles of indefinite length such as, for instance a single or multiconductor cable core, or an optical fibre, a flat tape is disposed alongside the article and with the tape lying on a converging path towards the article is folded over as tape and article proceed along a pass line. Sides of the tape are overlapped increasingly as movement continues along the pass line to bring the tape into wrapped engagement around the article. This increasing overlapping movement results in the tape producing a cone shape around the article. Difficulties are found with this conventional procedure in that intimate contact between article and the wrapping material is not always achieved as wrinkles or creases are formed in the wrapping material during wrapping.

This invention provides a method which avoids or minimises the disadvantageous wrinkling and creasing caused by the conventional method. Apparatus is also provided by the invention for use of the inventive method.

Accordingly, there is provided as one aspect of the invention a method of wrapping an article of indefinite length in which wrapping material is disposed alongside the article with one side of the material engaging the article at a first part of contact extending longitudinally of the article and the wrapping material is pressed in step-by-step manner against different peripheral surface parts of the article extending in succession circumferentially away from said first contact part.

This operation is performed in step-by-step manner upon laterally extending portions of the wrapping material extending in succession from the first contact part, each laterally extending portion being subjected to pressure between the article and a forming surface which conforms to the shape of an associated surface part of the article. Hence, each laterally extending portion of the wrapping material is applied into intimate contact with the article before the next laterally extending portion is subjected to pressure.

The invention is concerned particularly with the application of the wrapping material to the article by sticking, as by providing a contact adhesive surface on the material. The inventive method also relates to a method of wrapping in which adhesive is not used. In this latter case, however, it is essential to ensure that as the second and laterally extending portions of wrapping material are applied into intimate contact with the article, turning of these portions onto the article does not result in movement of a previous portion of the material away from the article.

According to another aspect of the invention, there is provided an apparatus for wrapping an article of indefinite length with wrapping material in which a plurality of rotatable formers are mounted in forming stations in a support, the forming stations being spaced-apart along a pass line. Each former has an annular forming surface and the forming surfaces are provided to conform substantially intimately with different surface parts of the article when covered in the wrapping material and are disposed in order from a first former with the forming surfaces extending in succession angularly around the pass line. The apparatus also comprises load-applying means for urging an article towards the forming surfaces to cause wrapping material between each forming surface and the article to be turned against a peripheral surface part of the article.

One embodiment of the invention will now be described, by way of example, with reference to the accompanying drawings, in which:

FIG. 1 is a plan view of apparatus for wrapping insulation tape around optical fibre, showing optical fibre being wrapped;

FIG. 2 is a cross-sectional view in side elevational taken along line 'II—II' in FIG. 1; and FIGS. 3, 4, 5, and 6, on a larger scale, are cross-sectional views, taken respectively along lines 'III—III', 'IV—IV', 'V—V', and 'VI—VI' in FIG. 2 to show different stages in wrapping of the tape around the fibre.

As shown in FIGS. 1 and 2, apparatus for wrapping an optical fibre generally comprises a plurality of freely rotatable rolls mounted in a support 11, the rolls providing either rotatable formers in forming stations for turning portions of wrapping material around the fibre 10 or load-applying means for urging the unit towards the formers as will be described.

More particularly, the rolls are disposed in spaced positions along a pass line for the fibre 10 and comprise a first former 12 horizontally mounted between parallel support plates 13, 14 of the support and two ungrooved load-applying rolls 15 and 16 disposed one upstream and the other downstream of the former 12 when considered along the pass line. The rolls 15, 16 lie parallel to the former 12 and slightly above former 12 so as to lie on the other side of the pass line to apply downwards pressure to the fibre 10 when passed beneath the rolls, to urge the unit towards a concave forming surface 17, (FIG. 4) i.e. formed on the arc of a circle, the forming surface extending annularly around the former 12. The forming surface conforms substantially intimately with a lower surface part of the fibre 10 when covered in the wrapping material.

Downstream of the roll 16 is disposed a pair of formers 18, 19 mounted for vertical rotation between plates 20 bridging between plates 13, 14. The formers 18, 19 are in mutual opposition across the pass line with their peripheral surfaces substantially in contact. As shown in FIG. 5, the formers 18, 19 are formed with concave forming surfaces 21, 22 which conform substantially intimately with upwardly extending surface parts of the fibre 10 when covered in the wrapping material, there being a degree of overlap between the area covered by the surfaces 21, 22 and that covered by surface 17.

Further downstream is a horizontal former 23 with an annular concave forming surface 24 and being substantially identical to the first former 12. In an exit plate 25 of the support is defined an exit die 26. The exit die and the forming surfaces 21, 22 are located so as to apply an upward load to the fibre 10 as it passes beneath the former 23 so as to urge the fibre towards the forming surface 24.

In use of the apparatus, the fibre 10 and wrapping material are fed at ambient temperature along diverging paths onto the pass line through a vertical slot (not shown) in an entrance plate 27 of the support. The wrapping material in the form of polyolefin tape 28 with an adhesive upper surface is passed over an aligning roll 29 which locates it in a desired lateral position to enable it to be applied to the fibre 10 in the required fashion. As shown by FIG. 3, the roll 29 has a flat bottomed annular recess 30 into which the tape fits for lateral guidance.

The tape is guided slightly to the right of the axis of the fibre 10 as shown by FIG. 3 to enable one lateral side portion of the tape to be wrapped completely onto the fibre 10 before the other side portion as will be described.

The tape then passes upwardly towards the fibre 10 and a first longitudinally extending portion 31 of the tape is brought into adhesive and intimate engagement with the fibre 10 as they both pass through the groove formed by the forming surface 17 of the former 12. The fibre 10 as it approaches and leaves former 12 engages beneath the rolls 15, 16 which provide a uniform downward force onto the fibre, minimize line vibrations and force the fibre towards forming surface 17. The result is that the portion 31 of the tape is sandwiched between the fibre 10 and the forming surface to cause it to conform to the shape of the forming surface and turn around the lower surface part of the fibre (FIG. 4).

After passing beneath roll 16, the unit and partially wrapped tape enters between the formers 18 and 19 with the fibre 10 aligned with the forming surfaces 21, 22. Each former 18, 19 acts as a load-applying means for urging the fibre 10 towards the forming surface of the other former. As the fibre passes through the gap defined between the forming surfaces, longitudinally extending portions 32, 33 of the tape disposed laterally adjacent to the portion 31 are caused to turn around the fibre as they are sandwiched against the forming surfaces. These portions then are adhesively applied against upwardly extending surface parts of the fibre 10 extending from the lower surface part of the fibre. As may be seen from FIG. 5, the portion 32 of tape is completely turned and adhered to the fibre 10 by forming surface 21 whereas the laterally further extending portion 33 still has a free edge 34 as it passes between the forming surfaces 21, 22.

After passing through the formers 18, 19, the fibre 10 and tape pass beneath the former 23 and the free edge 34 of tape is turned by the surface 24 completely over the fibre to overlap the portion 32 (FIG. 6). The fibre completely wrapped in the tape is then passed through the exit die.

In the process described above, the tape is wrapped around the fibre 10 in step-by-step fashion after first being adhesively applied to the fibre along a longitudinally extending portion. As the tape is wrapped in this fashion which entails turning succeeding tape portions 32 and 33 around the fibre in planes which are substantially normal to the plane occupied by the lowermost adhered portion of the tape, then no stresses are applied with a longitudinal directional component during turning which have the effect of forming wrinkles or creases in the tape. Thus the formation of wrinkles or creases is avoided or minimized.

The above process and apparatus may also be used for the application of tape of various other forms to cable cores in the form of multiconductor units or single conductors or wires. These forms comprise paper, steel, aluminum and copper tapes or alloy or composite materials. Such tapes may be provided to give mechanical strength or provide thermal, dielectric or corrosive strength to the cable core. In the application of some of these materials in which adhesive is not used to stick material to the article, it may be necessary to ensure that concave forming surfaces for wrapping succeeding laterally extending portions of the material, overlap a previously applied portion of material sufficiently to hold the previously applied portion against the article during the succeeding wrapping step.

In any of the above applications, design requirements for apparatus may change. For instance, bearing units may be used for the rolls and the roll spacing, shapes and dimensions of forming surfaces and of exit dies will need to be adjusted according to requirements. Also, spring loaded load-applying rolls may be used to control the force applied to the core to urge it towards selected forming surfaces.

What is claimed is:

1. A method of wrapping an optical fibre of indefinite length comprising:
   (a) providing a creasable wrapping tape having an adhesive on one surface;
   (b) locating the tape with said one surface facing the fibre; and with the fibre at substantially ambient temperature,
   (c) disposing the tape alongside the fibre and, solely by the use of at least one rolling and forming surface pressing onto the tape, bringing a first longitudinally extending portion of the tape into substantially intimate and adhering engagement with the fibre at a first part of contact;
   (d) turning a second longitudinally extending portion of the tape laterally adjacent to the first portion towards and into substantially intimate and adhering contact with a peripheral surface part of the fibre extending circumferentially from the first part of contact by pressing said second portion solely between the peripheral surface part of the fiber and another rolling and forming surface substantially conforming to the peripheral surface part;
   (e) repeating the turning process upon successive longitudinally extending portions of the tape to bring them into intimate and adhering contact with successive peripheral parts of the fibre, turning of the tape being in step-by-step manner from one longitudinally extending portion to another; and
   (f) by the sole use of at least one further rolling and forming surface, overlapping side edges of the tape with the adhesive on the outer edge sticking the side edges together.

2. A method according to claim 1, wherein the fibre and the tape are moved longitudinally together along a pass line through a succession of forming stations in each of which a longitudinally extending portion of tape is turned into contact with a peripheral surface part of the fibre.

3. A method according to claim 2, wherein in at least one station, longitudinally extending portions of the tape are turned simultaneously against diametrically opposite peripheral surface parts of the fibre.

4. A method according to claim 2, wherein at least one longitudinally extending portion of the tape is turned towards a peripheral surface part of the fibre by applying two loads against the fibre, one upstream and the other downstream along the pass line, to press the fibre towards the forming surface.

* * * * *